May 27, 1930.   R. P. SKIDMORE ET AL   1,760,530
CENTER PIN TURNING ATTACHMENT
Filed Nov. 7, 1928   6 Sheets-Sheet 1

May 27, 1930.  R. P. SKIDMORE ET AL  1,760,530
CENTER PIN TURNING ATTACHMENT
Filed Nov. 7, 1928   6 Sheets-Sheet 5

Inventors
Russell P. Skidmore
Alfred Voedisch
By Attorneys

May 27, 1930. R. P. SKIDMORE ET AL 1,760,530
CENTER PIN TURNING ATTACHMENT
Filed Nov. 7, 1928 6 Sheets-Sheet 6

Patented May 27, 1930

1,760,530

UNITED STATES PATENT OFFICE

RUSSELL P. SKIDMORE AND ALFRED VOEDISCH, OF FITCHBURG, MASSACHUSETTS, ASSIGNORS TO SHAW CRANE-PUTNAM MACHINE COMPANY, INC., OF FITCHBURG, MASSACHUSETTS, A CORPORATION OF DELAWARE

CENTER-PIN-TURNING ATTACHMENT

Application filed November 7, 1928. Serial No. 317,842.

This invention relates to an attachment designed chiefly to be applied to a journal and pin turning machine for the finishing of the third crank with which the driving wheel sets are provided, which are used on locomotives having a third cylinder.

The principal objects of the invention are to provide a device which, preferably, can be attached to the machine for turning the center pin on a crank shaft in position on said machine; to provide a turning arrangement involving a rotary wheel having the tools inside and means for rotating the wheel around the axis of the third pin in either direction; to provide the wheel with two tools on opposite sides to permit of the turning of the pin with one tool from about the center to one end and with the other tool by moving in the opposite direction for the opposite end; to provide the drum in two parts hinged together so that the upper part can be swung back for the introduction of the third pin in the proper position; to provide the worm wheel in two separable parts for the same purpose; to provide automatic means for locking the upper half of the worm wheel or gear to the upper half of the drum to prevent its falling out of the same when raising it and for unlocking automatically when restored to operating position; to provide simple means for adjusting the drum and connected parts to exactly the right spot, preferably by separate horizontal and vertical adjustments, accompanied by scales to show the adjustment, for use in resetting for the various strokes and angular rotations, which different wheel sets may have for the pin; to provide an improved tool holder and to provide simple and effective means for operating the various parts.

Other objects and advantages of the invention will appear hereinafter.

Reference is to be had to the accompanying drawings in which—

A locomotive is now on the market having a third cylinder located at the front and between the wheels. The piston rod from this cylinder is connected to a crank on one of the driving wheel sets at a point at the center of the axle as is indicated in dotted lines in Fig. 1. This set then has three pins, two outside ones, A and B, and one inside one C. This attachment is designed to be used on a well-known type of journal turning and quartering machine but is capable of use in other ways.

In order to attach it, the inside journal turning attachment, ordinarily employed, is removed and this attachment is put on in place of it on the bed 9 of the machine.

The attachment comprises a base 10, either a part of the main machine or a separate element, as may be desired. Preferably it is a separate member secured to the bed 9 in any convenient or usual way. This base is provided with T-slots 11 along which is guided a support 12 adjustable back and forth and fastened by T-bolts.

Figures 1, 2:
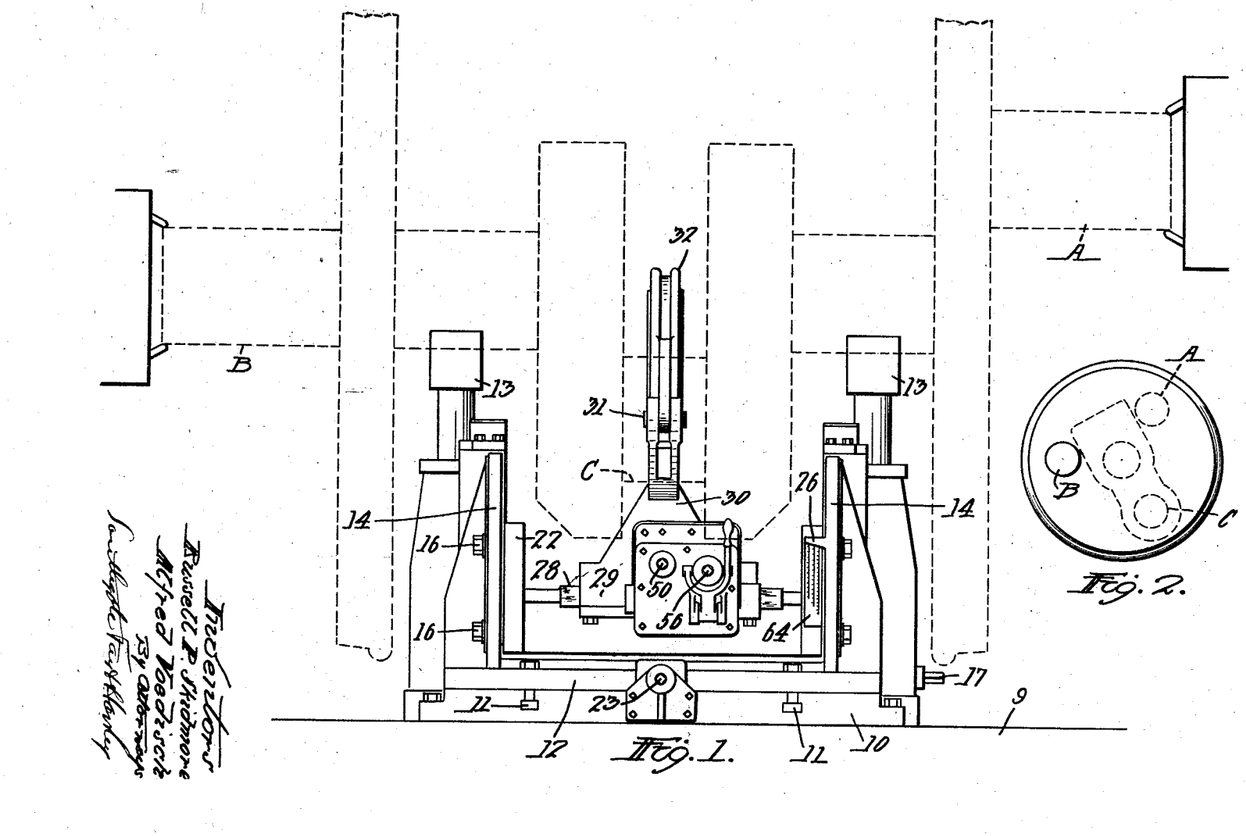
Fig. 1 is a front view of the attachment, the journal turning machine to which it is applied not being shown.
Fig. 2 is a diagrammatic end view of the wheel set indicating a position which the third pin may have with relation to the ordinary end pins.
Figure 3:
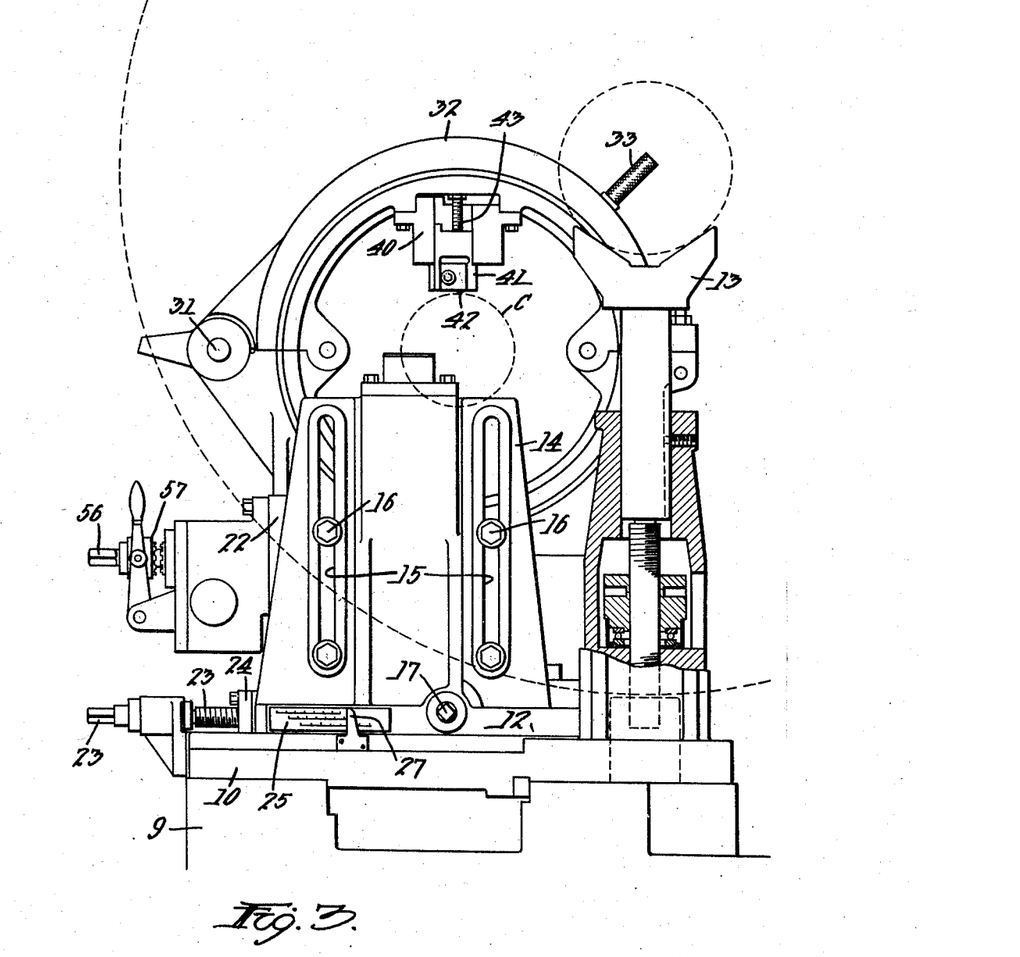
Fig. 3 is a side elevation of the drum and supporting parts, with parts in section.
Figure 4:
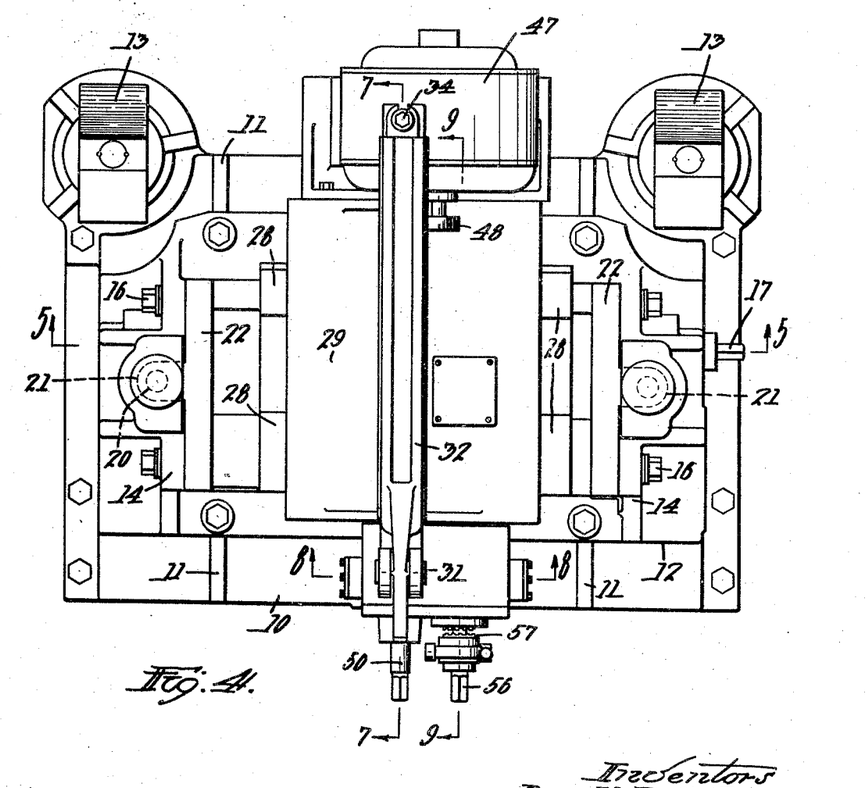
Fig. 4 is a plan of the attachment.
Figure 5:
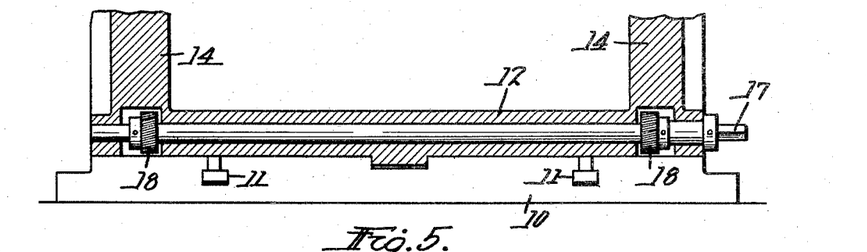
Fig. 5 is a sectional view on the line 5—5 of Fig. 4 showing the shaft for providing one of the adjustments.
Figure 6:
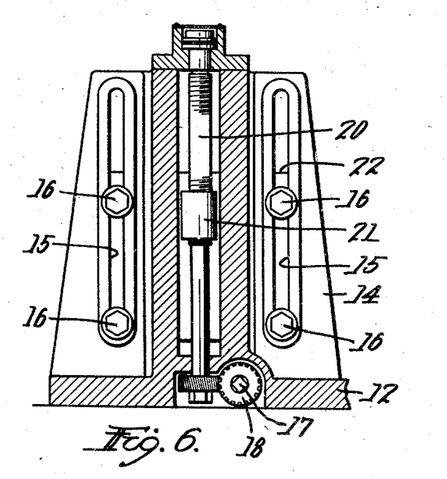
Fig. 6 is a side view of the knee-bracket showing the way of providing the vertical adjustment.
Figure 7:
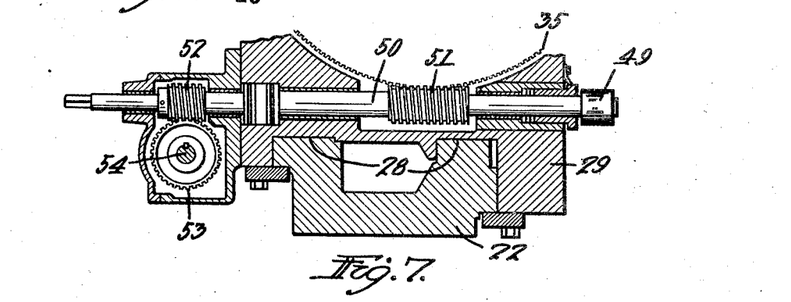
Figs. 7, 8 and 9 are sectional views on the lines 7—7, 8—8 and 9—9 respectively of Fig. 4 showing certain features in central section.
Figure 8:
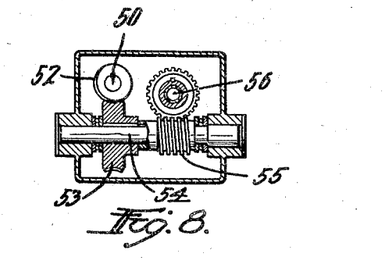

The base 10 carries a pair of vertically adjustable V-jacks 13 which carry the wheel set. The wheel set is mounted in a position on these jacks with the crank pin at the head stock end of the machine, directly over the main spindle in order to line up with the head end pin turning attachment. It is clamped in place with the wheel clamp usually employed at the back of the machine but not shown herein. The wheel set of course is located by the head and tail stock centers as shown in Fig. 1.

The support 12 carries integrally a pair of knee brackets 14 provided with vertical slots 15 through which pass bolts 16 or the like to hold the frame 22 at any desired height. The wheel set having been set in position, the support 12 and the entire attachment of course, with the exception of the V-jacks, is moved horizontally across the base and the frame 22 vertically on the knee brackets to adjust it to proper position. The latter is accomplished by a shaft 17 having a square end adapted to be turned by hand. On this shaft at opposite ends are spiral gears 18, which, by means of corresponding spiral gears operate two vertical screws 20, extending up through the knee brackets and having bearings at the top and bottom of the same. These screws are provided with nuts 21 in the form of projections from the frame 22. Consequently the turning of the shaft 17 will raise or lower that frame, the bolts 16 being first loosened.

Passing at right angles to the shaft 17 is a screw 23 which cooperates with a nut 24 to move the support 12 horizontally. It will be seen therefore that the frame 22 can be moved vertically any desired distance to get the frame centered with respect to the position of the crank pin C. Instead of locating it by the angle, the distances vertically and horizontally are employed. Both adjustments are indicated by scales 64 and 25 and stationary pointers 26 and 27 carried by the knee and base respectively. In this way the combination of readings up and toward the center give the correct locations for various strokes and angles and when the setting has once been found the machine can be set back to that position at will for machining a crank shaft having the same dimensions.

Figure 12:
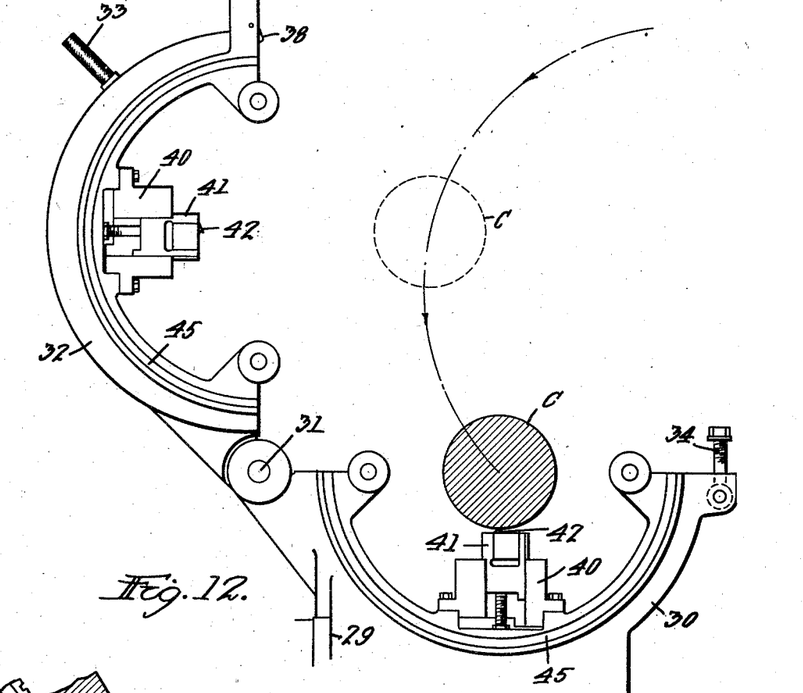
Fig. 12 is a side view of the drum showing it open for the insertion and removal of the work.
Figure 13:
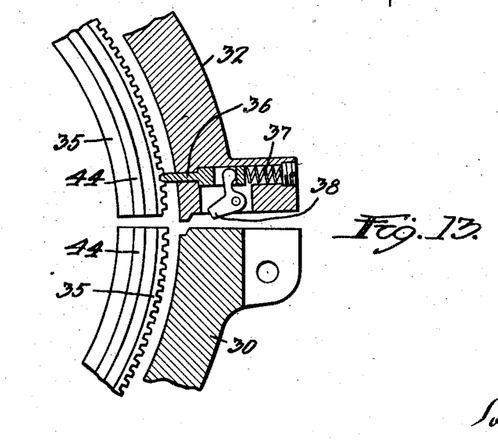
Fig. 13 is a fragmentary sectional view of the drum showing the locking and unlocking means.

This frame 22 carries rigidly mounted thereon horizontal ways 28 on which is slidably mounted a carriage 29 carrying the lower half 30 of the drum which has been mentioned. It also carries hinge pins 31 on which the upper half 32 of this drum is pivotally mounted, a handle 33 being shown for operating it. The top of the drum can be moved outwardly as shown in Fig. 12 for the insertion and removal of the crank pin in the proper position. It is held down by an eye bolt 34 in an obvious manner. The drum is provided with an annular recess in which is located a worm gear which consists of two halves 35. This gear wheel comes together when the top is closed down and constitutes the means by which the cutting tools are operated. They are mounted directly on it. In this case one cutting tool is mounted on each half of the split gear.

For the purpose of locking the upper half of the gear 35 to the top 32 of the drum when it is open, a locking tongue 36 is employed having a spring 37 for pressing it into one of the teeth of the upper half of the gear as soon as the upper half of the drum is raised a little so that the parts will move together and the gear will not fall out or become displaced. As soon as the upper half 32 is dropped down to position, the end of a lever 38 will engage the flat top surface of the lower member 30 of the drum and withdraw the plunger 36 so that the gear will then be free to rotate.

As stated, each half of this split gear carries a tool holder 40 bolted thereto. This tool holder is provided with ways on which reciprocates a tool carrier 41 carrying a tool 42. An adjusting screw 43 is provided for adjusting the tool. It is operated by a wrench inserted in a space in which the head of the screw is located. It will be noticed that the two tools, 42 are located on opposite sides of the worm wheel and project in opposite directions, the purpose of which will be explained later.

The gear wheel is provided with in-cut grooves 44 oppositely located into which circular gibs 45 project, these being bolted to the bottom and top sections 30 and 32 of the drum. In this way the gear is accurately guided in the drum.

It may be stated here that in order to separate the parts as shown in Fig. 12 it is necessary to turn the gear around until its plane of division is in registration with the plane of division of the drum, that is horizontally.

The machine is driven by a motor 47 carried on the carriage 29, directly on the shaft of which is a gear 48. This gear drives a gear 49 which is located on a shaft 50 provided with a worm 51, which meshes with and drives the split worm wheel 35. The shaft 50 is provided with a square end by which it can be turned by hand so as to bring the plane of division between the parts of the wheel 35 to horizontal position for the purpose above stated.

On the shaft 50 is a worm 52 driving a wheel 53 on a shaft 54 at right angles to the shaft 50. This short shaft 54, by means of a worm gear 55 drives a shaft 56 parallel with the shaft 50 and provided with a toothed clutch 57 which can be operated to connect the gear wheel of the gears 55 with the shaft 56 or leave it loose thereon.

On the shaft 56 is a spiral gear 58 driving a nut 59 which is threaded inside and meshes with the screw 60 which is fixed in stationary position on the frame 22. The rotation of this nut will feed the carriage 29 back and forth along the ways 28 by the screw 60 for cutting.

Figures 9, 10, 11, 14, 15, 16:
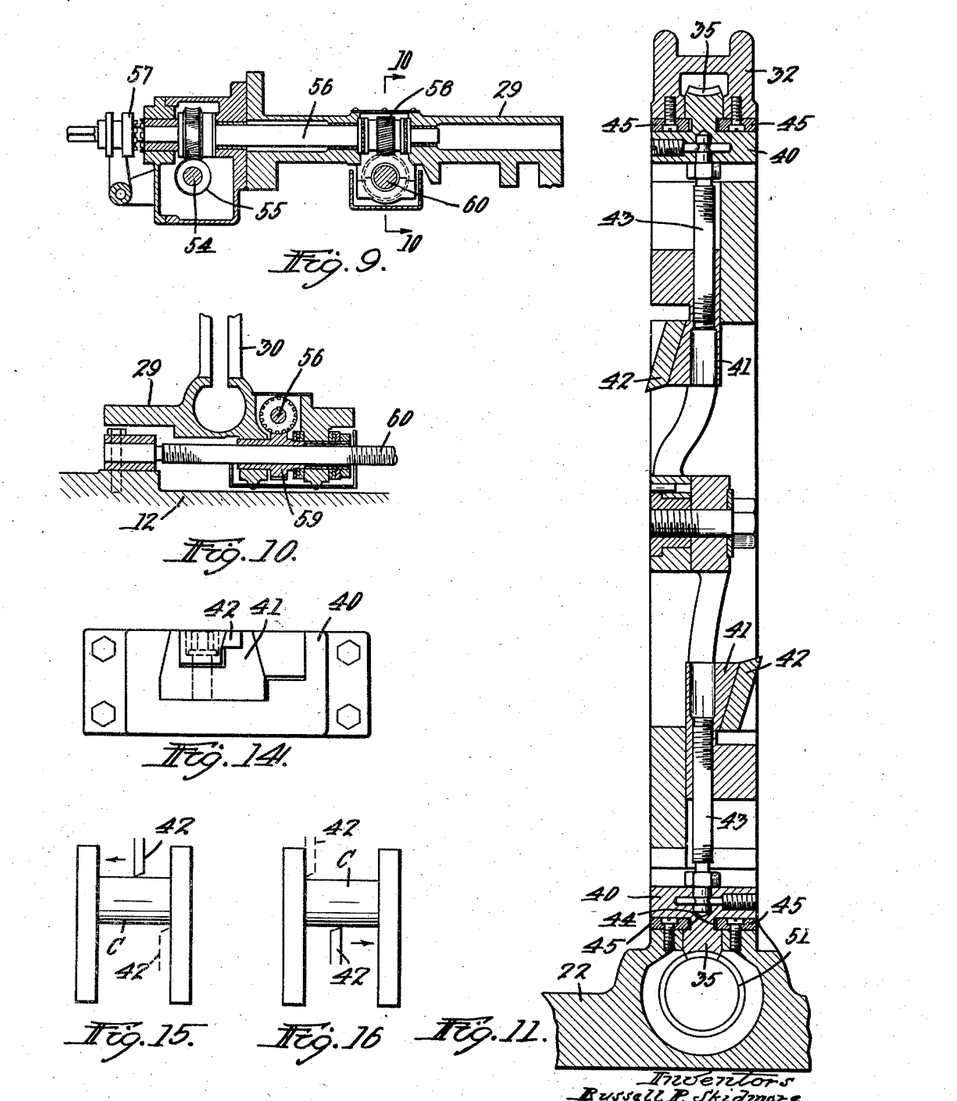
Fig. 10 is a sectional view on the line 10—10 of Fig. 9.
Fig. 11 is a sectional view through the center of the drum showing the cutting tools and their adjustment.
Fig. 14 is an end view of one of the tools and tool holder.
Figs. 15 and 16 are two diagrammatic views showing the method of operation.

In the operation of the machine it is preferred to start the cutting with one of the cutters 42 at about the middle of the work as indicated in Fig. 15 and feed it toward the face plate. The feed is then cut out when the tool arrives close to the shoulder and the tool is hand fed into the shoulder by means of a crank on the end of the hand feed shaft 56. The tool 42 on the left hand side of the head is then withdrawn from the pin and the right hand cutter head is adjusted approximately to the correct position to start the other half of the cut at the center of the pin.

The motor is started up in the reverse direction and this second cutter is fed toward the tail stock. This tool, of course, is set down to pick up the cut where the other tool started and finishes the other side of the pin. When the motor is reversed the entire mechanism, including the feed is reversed and the two tools are fed toward the tail stock, one of them cutting and the other not, of course. If a second cut is required to finish, the operation is simply repeated. This provides for machining this pin in a simple and convenient way and for doing it in quantity with comparatively simple arrangements for setting up each wheel set and getting them all set up alike.

The machining of the pin in opposite directions alternately from the center is an advantageous method and is designed to facilitate accomplishing it in this limited space.

The device can be made as an attachment on the journal turning, quartering and pin turning machine of a certain type now on the market, thus adapting that machine to this particular use and avoiding the necessity for a customer buying an entirely new machine for this purpose.

The hinged driving head or drum with the split worm wheel provides a very convenient means by which the work can be centered with respect to the machine, and the means for holding the worm gear in place and utilizing the bearing bushing for this purpose is also a mechanical and practical arrangement.

The means used to position the attachment for the various strokes and various angular locations of the pin is very simple and practical and the means for locking the split gear in the upper half of the drum is simple and effective. Altogether this invention is very practical and an easily set-up device for this purpose at a comparatively small original expense on account of its being designed as an attachment to a machine which concerns, doing this work, already have in their plants.

Although we have illustrated and described only one form of the invention we are aware of the fact that modifications can be made therein by any person skilled in the art without departing from the scope of the invention as expressed in the claims. Therefore we do not wish to be limited in this respect but what we do claim is:—

1. In a center-pin turning attachment for a journal turning, quartering, and pin turning machine, the combination of a base adapted to be fixed on the machine, and a support adjustable transversely on the base, said support having means for supporting the tools, projecting therefrom, of a frame vertically adjusted on said means, a drum supported by said frame, and rotatable means supported by the drum for rotating the tool around the circumference of the pin to be turned.

2. In a center-pin turning attachment for a journal turning, quartering, and pin-turning machine, the combination of a base adapted to be mounted on the machine, and a support adjustable transversely on the base, said support having knee brackets, of a frame vertically adjusted on said knee brackets, a carriage horizontally adjustable on the frame, a drum supported by said carriage, a rotatable means supported by the drum for rotating a cutting tool around the circumference of the pin to be turned, and means for feeding the carriage in an axial direction with respect to said drum for feeding the tool along the work on its cutting stroke either forward or backward while the tool is rotating around the work.

3. In a pin turning attachment, the combination with a support adjustable in one direction for locating it in proper position with respect to the work, said support having knee brackets extending upwardly therefrom, a frame adjustable up and down the knee brackets to position the work, said frame having ways perpendicular to the direction of adjustment of the support, a carriage movable along said ways, an annular drum supported by the carriage and surrounding the work, a tool holder within the drum, means for rotating the tool holder in the drum, and means for feeding the second frame axially with respect to the drum to feed the tool along the work.

4. In a pin turning attachment, the combination of a laterally adjustable support and means for adjusting it, said support having a pair of knees having vertical guides, a frame carried by the knees and adjustable vertically along the guides, indexing means between the frame and the knee brackets, indexing means on the support, said indexing means having provisions for showing the elevation and lateral position of the frame, whereby the frame can be located properly with respect to a center pin mounted opposite irrespective of its angular position, and means carried by said frame for turning a center pin.

5. In a center pin turning device, the combination with an adjustable carriage having a fixed portion, of a drum section hinged to said fixed portion to permit it to be raised and the center-pin to be introduced into it, means for holding the hinged portion in fixed position to complete the circle, a worm gear in two semi-circular parts rotatable within the drum, whereby when brought into proper position one half of the worm wheel can be raised with the hinged portion of the drum, said drum having a guide extending all around it for guiding the worm gear to rotate around a fixed center, a worm carried by the carriage for rotating the worm gear, an automatic locking device for locking the upper half of the worm gear to the hinged portion of the drum whenever the hinged portion is started to be raised, and means whereby said locking device is unlocked automatically when the hinged portion is located in contact with the lower portion of the drum.

6. In a crank pin turning device, the combination with a carriage having a fixed semi-circular portion and a semi-circular portion hinged thereto constituting a drum, and movable outwardly to permit insertion and removal of the center pin to be turned, of a gear, means comprising bearing bushings for guiding the gear to rotate within the drum, said gear being made in two semi-circular parts, whereby, when the split in the gear registers with the split in the fixed and hinged portions of the drum, the hinged portion and upper portion of the gear can be raised, means for retaining the upper portion of the gear in the hinged portion of the drum when so raised and a tool holder carried by the gear for operating on the work.

7. In a device for turning a cylindrical surface, the combination with a drum split in two portions, one being stationary and the other removable therefrom, of an operating gear split in two portions in the same way but rotatable in the drum, means for rotating the gear, two tool holders, one mounted on each half of the gear and each having means for holding a tool, and means for adjusting the tools radially, said tools being located in such a manner that the two tools project in opposite directions from a central line in the gear, said rotating means being reversible, whereby one of said tools can be moved along the work radially in one direction to turn down one end of it and the other can be moved in the other direction radially from an approximately central point to turn down the other end.

8. In a machine of the character described, the combination with a base and a support adjustably mounted thereon, of a screw on the base for adjusting the support, said support having a pair of vertical knee brackets, a frame carried by the knee brackets and vertically adjustable thereon, a screw perpendicular to the first named screw, means connected with the last named screw for adjusting the frame up and down the knee brackets, means for fastening the frame in adjusted position on the knee brackets, and means carried by said frame comprising a hollow drum and a rotatable gear therein for turning a cylinder passing through the drum.

9. In a machine of the character described, the combination with a base and a support adjustably mounted thereon, of a screw on the base for adjusting the support, said support having a pair of vertical guides, a frame carried by the guides and vertically adjustable thereon, a screw perpendicular to the first named screw, means connected with the last named screw for adjusting the frame up and down the guides, means for fastening the frame in adjusted position, a carriage adjustable along said frame, a pair of shafts carried by said carriage and parallel with the first named shaft and having ends for the application of a crank at one side of the machine, a motor carried by the carriage for rotating the upper one of said shafts, a worm on the latter shaft, a worm wheel meshing with the worm and having means for turning the surface of the center pin located inside the drum.

10. In a machine of the character described, the combination with a support having a pair of vertical guides, a frame carried by the guides and vertically adjustable thereon, a screw, means connected with the screw for adjusting the frame up and down the guides, a carriage adjustable along said frame, a pair of shafts carried by said carriage, a motor carried by the carriage for rotating one of said shafts, a worm on the latter shaft, a worm wheel meshing with the worm and having means for turning the surface of a center pin located inside the drum, said shaft having a second worm, a transverse shaft rotatable by the second worm and having means for rotating the shaft parallel with said shaft, said means comprising a hand-operated clutch, whereby the power feed of the last named shaft can be controlled, a stationary screw on the support having a nut thereon, and means on the clutch shaft for rotating the nut to feed the carriage along the screw on the frame.

11. In a machine of the character described, the combination with a support having a pair of vertical guides, a frame carried by the guides and vertically adjustable thereon, means for adjusting the frame up and down the guides, a carriage adjustable along said frame, a pair of shafts carried by said carriage, means for rotating one of said shafts, a worm on the latter shaft, a worm wheel meshing with the worm and having means for turning the surface of a center pin located inside the drum, said shaft having a second worm, a transverse shaft rotatable by the second worm and having means for rotating the shaft parallel with said shaft, a stationary screw on the support having a nut thereon, and means on the parallel shaft for rotating the nut to feed the carriage along the screw on the frame.

12. In a machine of the character described, the combination with a base and a support adjustably mounted thereon, of a screw on the base for adjusting the support, said support having a pair of vertical guides, a frame carried by the guides and vertically adjustable thereon, a screw perpendicular to the first named screw, means connected with the last named screw for adjusting the frame up and down the guides, a motor carried by the frame, a worm operated by the motor, a worm wheel meshing with the worm and having means for turning the surface of the center pin located inside the drum.

13. In a center pin turning device, the combination with a carriage having a fixed portion, of a drum section hinged to said fixed portion to permit it to be withdrawn, means for holding the hinged portion in fixed position to complete the circle, a gear in two semi-circular parts rotatable within the drum, whereby when brought into proper position one half of the worm wheel can be withdrawn with the hinged portion of the drum, an automatic locking device for locking one half of the worm gear to the hinged portion of the drum whenever the hinged portion is started to be withdrawn, and means whereby said locking device is unlocked automatically when the hinged portion is located in contact with the other portion of the drum.

14. In a center-pin turning attachment for a journal turning, quartering, and pin-turning machine, the combination of a base adapted to be mounted on the machine, of a carriage horizontally adjustable with respect to the base, a drum supported by said carriage, rotatable means supported by the drum for rotating a cutting tool around the circumference of the pin to be turned, and means for feeding the carriage in an axial direction with respect to said drum for feeding the tool along the work on its cutting stroke either forward or backward while the tool is rotating around the work.

In testimony whereof we have hereunto affixed our signatures.

RUSSELL P. SKIDMORE.
ALFRED VOEDISCH.